(12) United States Patent
Takahashi et al.

(10) Patent No.: US 11,760,850 B2
(45) Date of Patent: Sep. 19, 2023

(54) CARBON FIBER-CONTAINING POLYPROPYLENE COMPOSITION

(71) Applicant: SUMITOMO CHEMICAL COMPANY, LIMITED, Tokyo (JP)

(72) Inventors: Shun Takahashi, Chiba (JP); Masahiko Numakura, Chiba (JP); Kenichi Seno, Chiba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 133 days.

(21) Appl. No.: 17/213,933

(22) Filed: Mar. 26, 2021

(65) Prior Publication Data

US 2021/0301093 A1 Sep. 30, 2021

(30) Foreign Application Priority Data

Mar. 30, 2020 (JP) .................. 2020-059559
Oct. 15, 2020 (JP) .................. 2020-173997

(51) Int. Cl.
*C08L 23/12* (2006.01)
*C08L 23/26* (2006.01)
*C08J 5/04* (2006.01)

(52) U.S. Cl.
CPC ............... *C08J 5/042* (2013.01); *C08L 23/12* (2013.01); *C08L 23/26* (2013.01); *C08J 2323/12* (2013.01); *C08J 2323/26* (2013.01); *C08L 2203/30* (2013.01); *C08L 2205/02* (2013.01)

(58) Field of Classification Search
CPC ......... C08L 23/12–16; C08L 23/26–44; C08L 2205/02; C08L 23/10–14; C08J 5/042; C08J 2323/10; C08J 2323/12; C08J 2323/14; C08J 2323/26
See application file for complete search history.

(56) References Cited

FOREIGN PATENT DOCUMENTS

| EP | 3446844 A1 | 2/2019 |
|----|------------|--------|
| JP | 2005213478 A | 8/2005 |
| JP | 2013166921 A | 8/2013 |
| JP | 2017048313 A | 9/2015 |
| WO | 2016188886 A | 12/2016 |

*Primary Examiner* — Ana L. Woodward
(74) *Attorney, Agent, or Firm* — Meunier Carlin & Curfman LLC

(57) ABSTRACT

Provided is a fiber-reinforced polypropylene composition having a light weight and improved mechanical strength. A carbon fiber-containing polypropylene composition contains a predetermined amount of each of polypropylene (component 1), carbon fiber (component 2), and modified polypropylene (component 3), wherein the component 2 contains a predetermined amount of each of a C—O bond, a C=O bond, an O—C=O bond, a C—C bond, and a C—N bond.

6 Claims, No Drawings

CARBON FIBER-CONTAINING POLYPROPYLENE COMPOSITION

BACKGROUND OF THE DISCLOSURE

Field of the Disclosure

The present disclosure relates to a carbon fiber-containing polypropylene composition and a molded article containing the composition.

Description

A member formed of a polypropylene composition is used for an automobile member, and a member formed of a composition obtained by kneading a glass fiber with polypropylene is used to improve mechanical strength of the member.

However, a weight reduction of the automobile member is required. Therefore, use of carbon fiber having a specific gravity smaller than that of a glass fiber, and more recently, use of a recycled carbon fiber has been spotlighted.

One strand of carbon fiber is fiber having a diameter of about 7 μm. In general, a sizing agent is applied to a surface of the fiber and thousands to tens of thousands of strands of the fiber are used as a bundle. Then, the bundle is cut into a length of 3 to 6 mm and kneaded with polypropylene. Polypropylene, an epoxy compound, or a urethane compound is used as the sizing agent.

Used carbon fiber (for example, carbon fiber used in an aircraft) is fired and reused as the recycled carbon fiber.

Examples of the related art include JP-A-2013-166921 and WO 2016/188886 A.

SUMMARY OF THE DISCLOSURE

An object of the present disclosure is to implement a weight reduction and further improved mechanical strength of a fiber-reinforced polypropylene composition.

The present inventors focused on an interface between carbon fiber and polypropylene in order to improve mechanical strength of a member containing a polypropylene composition using carbon fiber, and particularly conducted studies on a surface of the carbon fiber, thereby completing the present disclosure.

Specifically, the present inventors found that a weight reduction is implemented using carbon fiber and a surface of the carbon fiber contains a specific bond in a specific amount in order to reinforce a polypropylene composition, such that tensile strength and bending strength of the composition or a molded article (automobile member or the like) containing the composition are improved.

The present disclosure relates to the following disclosures, but is not limited thereto.

Disclosure 1

A carbon fiber-containing polypropylene composition containing polypropylene (component 1), carbon fiber (component 2), and modified polypropylene (component 3), and satisfying all of the following requirements:

Requirement 1: a content of the component 1, a content of the component 2, and a content of the component 3 are 30 to 98 wt %, 1 to 50 wt %, and 1 to 20 wt %, respectively, with respect to 100 wt % of a total weight of the component 1, the component 2, and the component 3; and Requirement 2-1: the component 2 contains a C—O bond, a C═O bond, an O—C═O bond, a C—C bond, and a C—N bond, and a content of the C—O bond is 1 to 24% with respect to 100% of a total spectrum area of the C—O bond, the C═O bond, the O—C═O bond, the C—C bond, and the C—N bond.

Disclosure 2

A carbon fiber-containing polypropylene composition containing polypropylene (component 1), carbon fiber (component 2), and modified polypropylene (component 3), and satisfying all of the following requirements:

Requirement 1: a content of the component 1, a content of the component 2, and a content of the component 3 are 30 to 98 wt %, 1 to 50 wt %, and 1 to 20 wt %, respectively, with respect to 100 wt % of a total weight of the component 1, the component 2, and the component 3; and Requirement 2-2: the component 2 contains a C—O bond, a C═O bond, an O—C═O bond, a C—C bond, and a C—N bond, and a total content of the C═O bond and the O—C═O bond is 4 to 15% with respect to 100% of a total spectrum area of the C—O bond, the C═O bond, the O—C═O bond, the C—C bond, and the C—N bond.

Disclosure 3

A carbon fiber-containing polypropylene composition containing polypropylene (component 1), carbon fiber (component 2), and modified polypropylene (component 3), and satisfying all of the following requirements:

Requirement 1: a content of the component 1, a content of the component 2, and a content of the component 3 are 30 to 98 wt %, 1 to 50 wt %, and 1 to 20 wt %, respectively, with respect to 100 wt % of a total weight of the component 1, the component 2, and the component 3; and Requirement 2-3: the component 2 contains a C—O bond, a C═O bond, an O—C═O bond, a C—C bond, and a C—N bond, and a content of the C—O bond and a total content of the C═O bond and the O—C═O bond are 1 to 24% and 4 to 15%, respectively, with respect to 100% of a total spectrum area of the C—O bond, the C═O bond, the O—C═O bond, the C—C bond, and the C—N bond.

Disclosure 4

The carbon fiber-containing polypropylene composition according to any one of disclosures 1 to 3, wherein the component 3 is at least one modified polypropylene selected from the group consisting of maleic anhydride-modified polypropylene, epoxy-modified polypropylene, and carbodiimide-modified polypropylene.

Disclosure 5

A molded article containing the carbon fiber-containing polypropylene composition according to any one of disclosures 1 to 4.

The polypropylene composition has features of the present disclosure, such that a weight reduction and mechanical strength improvement of each of the fiber-reinforced polypropylene composition and the molded article containing the composition are implemented.

DETAILED DESCRIPTION

Definition

All numbers disclosed herein are approximate values, regardless whether the word "about" or "approximate" is used in connection therewith. The number may vary by 1 percent, 2 percent, 5 percent, or sometimes, 10 to 20 percent. Whenever a numerical range with a lower limit $R^L$ and an upper limit $R^U$ is disclosed, any number falling within the range is specifically disclosed. In particular, the following numbers within the range are specifically disclosed: $R=R^L + k*(R^U-R^L)$, wherein k is a variable ranging from 1 percent to 100 percent with a 1 percent increment, that is, k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

The description of "a lower limit to an upper limit" indicating a numerical range denotes "a lower limit or more and an upper limit or less", and the description of "an upper limit to a lower limit" indicating a numerical range denotes "an upper limit or less and a lower limit or more". That is, these descriptions denote numerical ranges including the lower limit and the upper limit.

Hereinafter, some embodiments of the present disclosure will be described in detail. However, the present disclosure is not limited to the following embodiments.

Carbon Fiber-Containing Polypropylene Composition

A carbon fiber-containing polypropylene composition of the present disclosure contains polypropylene (also referred to as a "component 1"), carbon fiber (also referred to as a "component 2"), and modified polypropylene (also referred to as a "component 3").

Polypropylene (Component 1)

Examples of the polypropylene (component 1) can include the following:

a propylene homopolymer;
a propylene-ethylene random copolymer;
a propylene-α-olefin random copolymer;
a propylene-ethylene-α-olefin copolymer; and
a propylene block copolymer composed of a propylene homopolymer component or a copolymer component composed mainly of propylene (hereinafter, referred to also as a polymer component I) and a copolymer obtained by copolymerizing propylene and at least one monomer selected from ethylene and α-olefin (hereinafter, also referred to as a polymer component II).

These polypropylenes may be used alone or in combination of two or more thereof.

As the α-olefin used in the component 1, 1-butene, 1-pentene, 1-hexene, 4-methyl-1-pentene, 1-octene, or 1-decene is preferred, and 1-butene, 1-hexene, or 1-octene is more preferred.

Examples of the propylene-α-olefin random copolymer can include a propylene-1-butene random copolymer, a propylene-1-hexene random copolymer, and a propylene-1-octene random copolymer.

Examples of the propylene-ethylene-α-olefin copolymer can include a propylene-ethylene-1-butene copolymer, a propylene-ethylene-1-hexene copolymer, and a propylene-ethylene-1-octene copolymer.

A content of the ethylene or the α-olefin contained in the propylene-ethylene random copolymer, the propylene-α-olefin random copolymer, or the propylene-ethylene-α-olefin copolymer is generally 0.01 to 30 wt % and preferably 0.1 to 20 wt %. Here, a total amount of the copolymer is 100 wt %.

In a case where the polymer component I in the propylene block copolymer is a copolymer component composed mainly of propylene, ethylene and at least one olefin selected from α-olefins having 4 to 12 carbon atoms are contained in the polymer component I, and a content thereof is generally 0.01 to 30 wt %. Here, a total amount of the polymer component I is 100 wt %.

In a case where the polymer component I is a copolymer component composed mainly of propylene, examples of the polymer component I can include a propylene-ethylene copolymer component, a propylene-1-butene copolymer component, and a propylene-1-hexene copolymer component.

Examples of the polymer component II in the propylene block copolymer can include a propylene-ethylene copolymer component, a propylene-ethylene-1-butene copolymer component, a propylene-ethylene-1-hexene copolymer component, a propylene-ethylene-1-octene copolymer component, a propylene-1-butene copolymer component, a propylene-1-hexene copolymer component, and a propylene octene copolymer component.

A content of ethylene and at least one olefin selected from α-olefins having 4 to 12 carbon atoms contained in the polymer component II is generally 1 to 80 wt %, preferably 20 to 70 wt %, and more preferably 30 to 60 wt %. Here, a total amount of the polymer component II is 100 wt %.

A content of the polymer component II contained in the propylene block copolymer is generally 1 to 70 wt %, preferably 5 to 50 wt %, and more preferably 10 to 40 wt %. Here, a total amount of the propylene block copolymer is 100 wt %.

Examples of the propylene block copolymer composed of the polymer component I and the polymer component II can include the following:

a (propylene)-(propylene-ethylene) copolymer;
a (propylene)-(propylene-ethylene-1-butene) copolymer;
a (propylene)-(propylene-ethylene-1-hexene) copolymer;
a (propylene)-(propylene-1-butene) copolymer;
a (propylene)-(propylene-1-hexene) copolymer;
a (propylene-ethylene)-(propylene-ethylene) copolymer;
a (propylene-ethylene)-(propylene-ethylene-1-butene) copolymer;
a (propylene-ethylene)-(propylene-ethylene-1-hexene) copolymer;
a (propylene-ethylene)-(propylene-1-butene) copolymer;
a (propylene-ethylene)-(propylene-1-hexene) copolymer;
a (propylene-1-butene)-(propylene-ethylene) copolymer;
a (propylene-1-butene)-(propylene-ethylene-1-butene) copolymer;
a (propylene-1-butene)-(propylene-ethylene-1-hexene) copolymer;
a (propylene-1-butene)-(propylene-1-butene) copolymer; and
a (propylene-1-butene)-(propylene-1-hexene) copolymer.

Carbon Fiber (Component 2)

Various types of carbon fiber known in the related art can be used as the carbon fiber (component 2). Specifically, examples of the carbon fiber can include polyacrylonitrile-based carbon fiber, rayon-based carbon fiber, pitch-based carbon fiber, polyvinyl alcohol-based carbon fiber, regenerated cellulosic carbon fiber, and pitch-based carbon fiber produced from mesophase pitch.

A fiber diameter of the component 2 is not particularly limited, and is preferably 3 μm or more and more preferably 8 μm or more, to reinforce the fiber, to improve productivity of a reinforcing fiber bundle, to reduce the time and effort required to connect the fiber bundles at the time of continuous production of pellets, and to improve productivity of the fiber. In addition, in order to increase an aspect ratio of the fiber in a case where a pellet length is fixed, the fiber diameter is preferably 30 μm or less and more preferably 20 μm or less.

An aspect ratio of the component 2 is not particularly limited, and is preferably 5 or more to reinforce the fiber. In addition, the aspect ratio is preferably 6,000 or less to improve moldability. The aspect ratio of the component 2 can be calculated from an average fiber diameter and an average fiber length according to the formula of (average fiber length)/(average fiber diameter).

As a raw material of the component 2, a continuous fiber bundle is used, and this is commercially available as a tow. In general, an average fiber diameter thereof is 3 to 30 µm, and the number of filament bundles is 500 to 24,000. Preferably, the average fiber diameter is 4 to 10 µm, and the number of bundles is 6,000 to 15,000.

In addition, a chopped strand can be used as the component 2. A length of the chopped strand is generally 1 to 20 mm, a diameter of the fiber is about 3 to 30 µm and preferably 4 to 10 µm.

A fiber length of the component 2 constituting the carbon fiber-containing polypropylene composition of the present disclosure is generally 0.05 to 200 mm, preferably 0.2 to 50 mm, and more preferably 4 to 20 mm.

An average aspect ratio (fiber length/fiber diameter) is generally 5 to 6,000, preferably 10 to 3,000, and more preferably 15 to 2,000.

A surface of the component 2 is preferably subjected to a surface treatment by oxidative etching, coating, or the like. Examples of the oxidative etching treatment can include an air oxidation treatment, an oxygen treatment, a treatment with oxidizing gas, a treatment with ozone, a corona treatment, a flame treatment, an (atmospheric pressure) plasma treatment, and a treatment with an oxidizing liquid (nitric acid, an aqueous solution of an alkali metal salt of hypochlorous acid, potassium dichromate-sulfuric acid, or potassium permanganate-sulfuric acid). Examples of a substance that covers the carbon fiber can include carbon, silicon carbide, silicon dioxide, silicon, a plasma monomer, ferrocene, and iron trichloride.

In addition, if necessary, urethane-based, olefin-based (polypropylene or the like), acryl-based, nylon-based, butadiene-based, epoxy-based (including special epoxy), and polyester-based sizing agents may be used.

Modified Polypropylene (Component 3)

The modified polypropylene (component 3) is not particularly limited as long as it is polypropylene modified to impart a polarity. Examples of the modified polypropylene can include an (anhydrous) carboxylic acid, epoxide, oxazoline, isocyanate, and polypropylene modified with carbodiimide or the like, and preferred examples of the modified polypropylene can include maleic anhydride-modified polypropylene, carbodiimide-modified polypropylene, and epoxy-modified polypropylene.

Maleic Anhydride-Modified Polypropylene (Polypropylene MM)

Examples of the maleic anhydride-modified polypropylene (also referred to as polypropylene MM) as the component 2 can include the following 1 to 4:

1. modified polypropylene obtained by graft-polymerizing an unsaturated carboxylic acid and/or a derivative thereof to a propylene homopolymer;

2. modified polypropylene obtained by graft-polymerizing an unsaturated carboxylic acid and/or a derivative thereof to a propylene copolymer composed of at least two monomers;

3. modified polypropylene obtained by graft-polymerizing an unsaturated carboxylic acid and/or a derivative thereof to a block copolymer obtained by copolymerizing at least two olefins after homopolymerization of propylene; and 4. modified polypropylene obtained by random-copolymerizing or block-copolymerizing an unsaturated carboxylic acid and/or a derivative thereof, propylene, and optionally, at least one olefin.

In order to produce the polypropylene MM, it is possible to use various methods described in "Practical Polymer Alloy Design" (written by Fumio Ide, published by Kogyo Chosakai Publishing Co., Ltd. (1996)), Prog. Polym. Sci., 24, 81-142 (1999), and JP-A-2002-308947. That is, any of a solution method, a bulk method, and a melt-kneading method may be used. In addition, these methods may be used in combination.

Examples of the unsaturated carboxylic acid used for producing the polypropylene MM can include maleic acid, fumaric acid, itaconic acid, acrylic acid, and methacrylic acid. In addition, examples of the derivative of the unsaturated carboxylic acid can include acid anhydride derived from the unsaturated carboxylic acid, an ester compound, an amide compound, an imide compound, and a metal salt. Specific examples of the derivative of the unsaturated carboxylic acid can include maleic anhydride, itaconic anhydride, methyl acrylate, ethyl acrylate, butyl acrylate, glycidyl acrylate, methyl methacrylate, ethyl methacrylate, butyl methacrylate, glycidyl methacrylate, monoethylester maleate, diethylester maleate, monomethylester fumarate, dimethylester fumarate, acrylamide, methacrylamide, maleic acid monoamide, maleic acid diamide, fumaric acid monoamide, maleimide, N-butylmaleimide, and sodium methacrylate. In addition, a compound, such as citric acid and malic acid, which is subjected to dehydration in a step of performing graft polymerization to polypropylene to generate an unsaturated carboxylic acid may also be used.

Glycidyl esters of acrylic acid and methacrylic acid, and maleic anhydride are preferred as the unsaturated carboxylic acid and/or the derivative thereof.

Preferred examples of the polypropylene MM can include:

(1) modified polypropylene obtained by graft-polymerizing maleic anhydride to polypropylene containing a propylene monomer and optionally, an ethylene monomer as a main structural unit; and (2) modified polypropylene obtained by copolymerizing an olefin containing a propylene monomer and optionally, an ethylene monomer as a main component, and methacrylic acid glycidyl ester or maleic anhydride.

In addition, as the polypropylene MM, maleic anhydride-modified polypropylene containing 0.01 to 10 wt % of a polymerizable monomer unit derived from an unsaturated carboxylic acid and/or a derivative thereof is preferred from the viewpoint of mechanical strength such as impact strength, fatigue characteristics, and rigidity of a fiber-reinforced resin molded article. In particular, in a case of polypropylene MM obtained by random-copolymerization or block-copolymerization by using an unsaturated carboxylic acid and a derivative thereof, a content of a polymerizable monomer unit derived from the unsaturated carboxylic acid and/or the derivative thereof is preferably 3 to 10 wt %. In a case of polypropylene MM obtained by graft-polymerization by using an unsaturated carboxylic acid and a derivative thereof, a content of a polymerizable monomer unit derived from the unsaturated carboxylic acid and/or the derivative thereof is preferably 0.01 to 10 wt %.

Carbodiimide-Modified Polypropylene (Polypropylene CM)

The carbodiimide-modified polypropylene (also referred to as polypropylene CM) is obtained by reacting polypropylene having a group reacting with a carbodiimide group (also referred to as a polymer C') with a carbodiimide group-containing compound (also referred to as a compound C). A specific method thereof can include a method of melting and kneading both the components.

Hereinafter, an example of a case where the components are melted and kneaded will be described. An example of a method of melting and kneading the polymer C' and the compound C can include a method of simultaneously or sequentially adding and kneading the polymer C' and the compound C with a Henschel mixer, a V-type blender, a tumbler blender, a ribbon blender, or the like, and then melting and kneading the polymer C' and the compound C with a single screw extruder, a multiple screw extruder, a kneader, a Banbury mixer, or the like. Specifically, it is preferable to use an apparatus excellent in a kneading performance such as a multiple screw extruder, a kneader, a Banbury mixer, or the like because a polymer composition in which the respective components are more uniformly dispersed and reacted can be obtained.

In a case where the melting and kneading are performed using an extruder, the polymer C' and the compound C may be mixed with each other in advance and then supplied from a hopper, or some components may be supplied from a hopper and then other components may be supplied through a supply port provided at any position between the vicinity of the hopper and a tip end of the extruder.

A temperature at which the components are melted and kneaded is equal to or higher than the highest melting point of the melting points of the components to be mixed. Specifically, the melting and kneading are performed in a range of preferably 150 to 300° C., more preferably 200 to 280° C., and still more preferably 230 to 270° C.

The polypropylene CM is excellent in fluidity at 190° C. or 230° C. A melt flow rate (MFR) of the polypropylene CM at 190° C. or 230° C. and a load of 2.16 Kg is preferably 0.01 to 400 g/10 min, more preferably 0.1 to 300 g/10 min, and still more preferably 1 to 200 g/10 min. When the MFR is within the above range, a reinforcing property and dispersibility of reinforcing fiber are excellent, which is preferable.

In order to produce the polypropylene CM, it is possible to use various methods such as "Practical Polymer Alloy Design" (written by Fumio Ide, published by Kogyo Chosakai Publishing Co., Ltd. (1996)), Prog. Polym. Sci., 24, 81-142 (1999). That is, any of a solution method, a bulk method, and a melt-kneading method may be used. In addition, these methods may be used in combination.

In the production of the polypropylene CM, when a mixing ratio is set so that a ratio of the number of moles of the group reacting with the carbodiimide group in the polymer C' to the number of moles of the compound C is satisfied to 1:0.2 to 10.0, preferably 1:0.4 to 8, and more preferably 1:2 to 8, polypropylene CM having high reaction efficiency between the polymer C' and the compound C and excellent fluidity can be obtained, which is preferable.

In addition, a content of the carbodiimide group in the polypropylene CM with respect to 100 g of the polypropylene CM is not particularly limited, and preferably 1 mmol or more, more preferably 5 mmol or more, and still more preferably 10 mmol or more, to enhance the reinforcement effect of reinforcing fiber and the effect of improving water deterioration resistance. In addition, the content is preferably 200 mmol or less, more preferably 150 mmol or less, and still more preferably 100 mmol or less, to enhance moldability, the reinforcement effect of the reinforcing fiber, the effect of improving dispersibility, and cost-effectiveness. In this light, when producing the polypropylene CM, it is preferable that a mixing amount of the compound C is adjusted so that the content of the carbodiimide group in the polypropylene CM is in the above range.

Furthermore, in the production of the polypropylene CM, it is also important to control the reaction between the group reacting with the carbodiimide group in the polymer C' and the carbodiimide group in the compound C. A degree of progression of the reaction between the group reacting with the carbodiimide group in the polymer C' and the carbodiimide group in the compound C can be examined by, for example, the following method.

A heat press sheet of each of the polymer C' and the polypropylene CM obtained by the reaction is prepared, and then infrared absorption is measured using an infrared absorption analyzer. From the obtained sheets, an absorbance in an absorption band (1,790 cm$^{-1}$ when using maleic anhydride) resulting from a peak intensity of the compound having the group reacting with the carbodiimide group in each of the polymer C' and the polypropylene CM can be compared with an absorbance before and after the reaction to calculate a reaction rate$_c$ using the following equation.

$$\text{Reaction rate}_C (\%) = X_C/Y_C \times 100$$

$X_C$=absorbance of group reacting with carbodiimide group in polymer C' before reaction-absorbance of group reacting with carbodiimide group in polypropylene CM after reaction $Y_C$=absorbance of group reacting with carbodiimide group in polymer C' before reaction The reaction rate for the polypropylene CM calculated by the above method is preferably 20 to 100%, more preferably 25 to 100%, and still more preferably 40 to 100%.

In addition, the polypropylene CM is produced by reacting the carbodiimide group (N=C=N) of the compound C with the group reacting with the carbodiimide group in the polymer C' as described, but a carbodiimide residue derived from the compound C bonded to polypropylene may be present in the polymer C', and the carbodiimide residue interacts with the reinforcing fiber to contribute to the reinforcing property and dispersibility. The amount of the carbodiimide residue can be considered as a size of a peak resulting from contraction vibration of the N=C=N group in 2,130 to 2,140 cm$^{-1}$ in IR measurement.

The polypropylene CM may contain two or more polymers C' and two or more compounds C.

In addition, a known process stabilizer, heat resistance stabilizer, heat-aging-resistant agent, or the like can also be added to the polypropylene CM as long as the object of the present disclosure is not impaired.

Polypropylene Having Group Reacting with Carbodiimide Group (Polymer C')

The polypropylene having the group reacting with the carbodiimide group (polymer C') can be obtained by introducing a compound reacting with a carbodiimide group into polypropylene.

An example of the compound reacting with the carbodiimide group can include a compound having a group having active hydrogen having reactivity with a carbodiimide group, and a specific example thereof can include a compound having a group derived from a carboxylic acid, amine, alcohol, thiol, or the like. Among them, a compound having a group derived from a carboxylic acid is preferably used, and particularly, an unsaturated carboxylic acid and/or a derivative thereof is preferred. In addition, a compound having a group which easily converted into a group having active hydrogen by water or the like can also be preferably used in addition to the compound having the group having the active hydrogen. A specific example thereof can include a compound having an epoxy group or a glycidyl group. In the present disclosure, the compounds reacting with the carbodiimide group may be used alone or in combination of two or more thereof.

In a case where an unsaturated carboxylic acid and/or a derivative thereof is used as the compound reacting with the carbodiimide group, examples thereof can include an unsaturated compound having one or more carboxylic acid groups and an unsaturated compound having one or more carboxylic acid anhydride groups and derivatives thereof. Examples of the unsaturated compound can include a vinyl group, a vinylene group, and an unsaturated cyclic hydrocarbon group. Specific examples thereof can include an unsaturated carboxylic acid such as acrylic acid, methacrylic acid, maleic acid, fumaric acid, tetrahydrophthalic acid, itaconic acid, citraconic acid, crotonic acid, isocrotonic acid, norbornenedicarboxylic acid, or bicyclo[2,2,1]hepto-2-ene-5,6-dicarboxylic acid, and acid anhydride thereof and a derivative thereof (for example, acid halide, amide, imide, ester, or the like). Specific examples of the compound can include malenyl chloride, malenyl imide, maleic anhydride, itaconic anhydride, citraconic anhydride, tetrahydrophthalic anhydride, bicyclo[2,2,1]hepto-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hepto-2-ene-5,6-dicarboxylate, hydroxyethyl (meth) acrylate, hydroxypropyl (meth) acrylate, glycidyl (meth) acrylate, aminoethyl methacrylate, and aminopropyl methacrylate.

Among them, maleic anhydride, (meth)acrylic acid, itaconic anhydride, citraconic anhydride, tetrahydrophthalic anhydride, bicyclo[2,2,1]hepto-2-ene-5,6-dicarboxylic anhydride, hydroxyethyl (meth) acrylate, glycidyl methacrylate, or aminopropyl methacrylate is preferred. Further, dicarboxylic anhydride such as maleic anhydride, itaconic anhydride, citraconic anhydride, tetrahydrophthalic anhydride, or bicyclo[2,2,1]hepto-2-ene-5,6-dicarboxylic anhydride is particularly preferred. In particular, in the present disclosure, maleic anhydride is most preferred as the compound reacting with the carbodiimide group.

As a method of introducing a compound reacting with a carbodiimide group into polypropylene, various methods can be adopted. Examples thereof can include a method of graft-copolymerizing a compound reacting with a carbodiimide group to a polypropylene main chain and a method of radical-copolymerizing an olefin such as propylene and a compound reacting with a carbodiimide group. Hereinafter, the case of graft copolymerization and the case of radical copolymerization will be described, individually, in detail.

Graft Copolymerization

The polymer C' can be obtained by graft-copolymerizing a compound having a group reacting with a carbodiimide group to a polypropylene main chain.

Polypropylene used as the polypropylene main chain is a homopolymer or copolymer containing a propylene unit as a main component. In a case where a sub-component is present, as an olefin unit of the sub-component, an aliphatic α-olefin, cyclic olefin, non-conjugated diene, or aromatic olefin having 2 to 20 carbon atoms ($C_{2-20}$), preferably 2 to 10 carbon atoms ($C_{2-10}$), and more preferably 2 to 8 carbon atoms ($C_{2-8}$) other than propylene may be used. Here, a content of the propylene unit as the "main component" in the polypropylene is generally 50 mol % or more, preferably 60 mol % or more, and still more preferably 70 mol % or more. Preferred examples of the olefin that can be the sub-component can include ethylene, 1-butene, 4-methyl-1-pentene, 3-methyl-1-butene, 1-hexene, 1-octene, tetracyclododecene, norbornene, and styrene. In addition, both an isotactic structure and a syndiotactic structure can be used for the polypropylene, and there is no particular limitation on stereoregularity.

A density of the polypropylene used for graft modification is preferably 0.8 to 1.1 $g/cm^3$, more preferably 0.8 to 1.05 $g/cm^3$, and still more preferably 0.8 to 1 $g/cm^3$. A melt flow rate (MFR) of the polypropylene at 190° C. or 230° C. and a load of 2.16 kg according to ASTM D1238 is generally 0.01 to 500 g/10 min, preferably 0.05 to 300 g/10 min, and more preferably 0.1 to 100 g/10 min. When the density and the MFR of the polypropylene are within the above ranges, a density and an MFR of a graft copolymer after modification are also similar to those of the polypropylene, resulting in easy handling.

In addition, a crystallinity degree of the polypropylene used for the graft modification is generally 2% or more, preferably 5% or more, and more preferably 10% or more. When the crystallinity degree is within the above range, handling of the graft copolymer after modification is excellent.

A number average molecular weight of the polypropylene ($Mn_{basePP}$) used for the graft modification measured by gel permeation chromatography (GPC) is preferably 5,000 to 500,000 and more preferably 10,000 to 100,000. When the $Mn_{basePP}$ is within the above range, handling is excellent. In a case of a propylene-ethylene-based polyolefin, the number average molecular weight can be determined in terms of polypropylene when the amount of comonomer (the amount of ethylene) is less than 10 mol % and in terms of propylene-ethylene (based on a propylene content of 70 mol %) when the amount of comonomer is 10 mol % or more.

The polypropylene as described above can be produced by any of methods known in the related art. For example, polymerization can be performed using a titanium catalyst, a vanadium catalyst, a metallocene catalyst, or the like. In addition, the polypropylene may be in a form of any of a resin and an elastomer, both an isotactic structure and a syndiotactic structure can be used for the polypropylene, and there is no particular limitation on stereoregularity. A commercially available resin can be used as it is.

In a case where the polymer C' is obtained by graft copolymerization, a compound reacting with a carbodiimide group, and if necessary, other ethylenically unsaturated monomers are graft-copolymerized to the polypropylene as a graft main chain in the presence of a radical initiator.

A method of grafting the compound reacting with the carbodiimide group to the polypropylene main chain is not particularly limited, and a known graft polymerization method such as a solution method or a melting and kneading method can be adopted.

Radical Copolymerization

The polymer C' can be obtained by radical-copolymerizing a compound reacting with a carbodiimide group and an olefin such as propylene. The same olefin as the olefin for forming the polyolefin as a graft main chain described above can be adopted as the olefin. In addition, the compound reacting with the carbodiimide group is also the same as described above.

A method of radical-copolymerizing the compound reacting with the carbodiimide group and the olefin is not particularly limited, and a known radical copolymerization method can be adopted.

Regardless of which copolymerization method such as graft copolymerization or radical copolymerization is adopted, it is preferable that the polymer C' satisfies the following conditions.

A content of the group reacting with the carbodiimide group in the polymer C' is not particularly limited, and is preferably 0.01 wt % or more to increase the number of bonding sites between the compound C as a skeleton of the polypropylene CM and the polymer C' so as to enhance a reinforcing property and dispersibility of reinforcing fiber in the fiber-reinforced polypropylene composition. In addition, the content is preferably 10 wt % or less, more preferably 3 wt % or less, and still more preferably 2 wt % or less, to suppress crosslinking of the group reacting with the carbodiimide group by the compound C so as to facilitate the production of the polypropylene CM.

It is preferable that a number average molecular weight of the polymer C' is low and a molar ratio of (the number of moles of the group reacting with the carbodiimide group)/(the number of moles of a molecular chain of the polymer C') is small in order to prevent the crosslinking of the polymer C'. This means that in a case where the number of groups reacting with the carbodiimide group present on one molecular chain of the polymer C' is not plural but is as singular as possible, when the carbodiimide group (N=C=N) of the compound C reacts with the group reacting with the carbodiimide group in the polymer C', the carbodiimide groups can be bonded without crosslinking and gelation.

In a case where the polymer C' is obtained by graft polymerization, when polypropylene as a graft main chain is a resin having a large amount of ethylene, crosslinking is likely to occur during production of the polypropylene CM as compared with a case when a resin having a large amount of an α-olefin copolymer such as an ethylene-butene copolymer is used. Therefore, it is preferable that the group reacting with the carbodiimide group is adjusted so that the number of groups reacting with the carbodiimide group present on one molecular chain of the polymer C' is as singular as possible in order to use a resin having a large amount of ethylene as a graft main chain and suppress crosslinking for production of the polypropylene CM.

In addition, in a case where polypropylene as a graft main chain is a resin whose molecular weight tends to be reduced by thermal decomposition, a high viscosity phenomenon due to crosslinking is unlikely to occur. Therefore, in a case where a resin that is likely to be thermally decomposed is used as a graft main chain, even when a plurality of groups reacting with the carbodiimide group are present on one molecular chain of the polymer C', the polypropylene CM can be produced without increasing the viscosity in some cases.

A melt flow rate (MFR) of the polymer C' having the group reacting with the carbodiimide group at a load of 2.16 kg and 190° C. or 230° C. according to ASTM D1238 is preferably 0.01 to 500 g/10 min and more preferably 0.05 to 300 g/10 min. When the MFR is in the above range, polypropylene CM having an excellent effect of improving a reinforcing property and dispersibility of reinforcing fiber can be obtained.

In addition, a density of the polymer C' is preferably 0.8 to 1.1 g/cm$^3$, more preferably 0.8 to 1.05 g/cm$^3$, and still more preferably 0.8 to 1 g/cm$^3$.

Carbodiimide Group-Containing Compound (Compound C)

The carbodiimide group-containing compound (compound C) is preferably polycarbodiimide having a repeating unit represented by the following General Formula (4).

  (4)

(wherein $R_C$ represents a divalent organic group.)

A method of synthesizing polycarbodiimide is not particularly limited, and for example, polycarbodiimide can be synthesized by reacting an organic polyisocyanate in the presence of a catalyst for accelerating a carbodiimide reaction of an isocyanate group.

A number average molecular weight ($Mn_c$) in terms of polystyrene of the compound C determined by gel permeation chromatography (GPC) is preferably 400 to 500,000, more preferably 1,000 to 10,000, and still more preferably 2,000 to 4,000. When the $Mn_c$ is in the above range, polypropylene CM having an excellent effect of improving a reinforcing property and dispersibility of reinforcing fiber can be obtained, which is preferable.

Monocarbodiimide may be added to the compound C, or a single carbodiimide group-containing compound or a mixture of a plurality of carbodiimide group-containing compounds can also be used.

It is possible to use a commercially available carbodiimide group-containing compound as it is. Examples of the commercially available carbodiimide group-containing compound can include Carbodilite (registered trademark) HMV-15CA, Carbodilite (registered trademark) HMV-8CA, and Carbodilite (registered trademark) LA1 (manufactured by Nisshin Boseki Co., Ltd.), and Stabaxol (registered trademark) P and Stabaxol (registered trademark) P400 (manufactured by Rhein Chemie Rheinau GmbH).

A content of the carbodiimide groups in the compound C and the obtained polypropylene CM can be measured by $^{13}$C-NMR, IR, a titration method, or the like to grasp a carbodiimide equivalent. A peak at 130 to 142 ppm is observed by $^{13}$C-NMR and a peak at 2,130 to 2,140 cm$^{-1}$ is observed by IR.

For example, $^{13}$C-NMR measurement is performed as follows. That is, 0.35 g of a sample is heated and dissolved in 2.0 ml of hexachlorobutadiene. The solution is filtered with a glass filter (G2), 0.5 ml of deuterated benzene is added to the solution, and the solution is charged into an NMR tube having an inner diameter of 10 mm. Then, $^{13}$C-NMR measurement is performed at 120° C. using a GX-500 type NMR measuring apparatus (manufactured by JEOL Ltd.). An integration number is 10,000 times or more.

For example, IR measurement is performed as follows. That is, a sample is heat-pressed at 250° C. for 3 minutes to prepare a sheet, and then a infrared absorption spectrum of the sheet is measured by a transmission method using an infrared spectrophotometer (FT-IR 410 type, manufactured by JASCO Corporation). As the measurement conditions, a resolution is set to 2 cm$^{-1}$ and an integration number is set to 32 times.

The infrared absorption spectrum measured by the transmission method is inversely proportional to a thickness of the sample as shown by Lambert-Beer's law, and an absorbance itself does not indicate a concentration of the carbodiimide group in the sample. Therefore, for measuring the content of the carbodiimide group, the thickness of the sample to be measured is required to be equalized, or a peak intensity of the carbodiimide group is required to be normalized using an internal standard peak.

In a case where the content of the carbodiimide group in the polypropylene CM is measured by IR measurement, the IR measurement is performed using a sample whose concentration of the carbodiimide group is known in advance, a calibration curve is prepared using a ratio of an absorbance at a peak appearing at 2,130 to 2,140 cm$^{-1}$ to an absorbance at an internal standard peak, and the measured value of the sample is substituted in the calibration curve to determine a concentration.

As the internal standard peak, a peak derived from the polypropylene skeleton may be used, or an internal standard substance may be mixed in advance so that a concentration thereof in the sample is constant and then used for measurement.

Epoxy-Modified Polypropylene (Polypropylene EM)

The epoxy-modified polypropylene (also referred to as polypropylene EM) is obtained by reacting polypropylene having a group reacting with an epoxy group (also referred to as a polymer E') with an epoxy group-containing compound (also referred to as a compound E). A specific method thereof can include a method of melting and kneading both the components.

Hereinafter, an example of a case where the components are melted and kneaded will be described. An example of a method of melting and kneading the polymer E' and the compound E can include a method of simultaneously or sequentially adding and kneading the polymer E' and the compound E with a Henschel mixer, a V-type blender, a tumbler blender, a ribbon blender, or the like, and then melting and kneading the polymer E' and the compound E with a single screw extruder, a multiple screw extruder, a kneader, a Banbury mixer, or the like. Specifically, it is preferable to use an apparatus excellent in a kneading performance such as a multiple screw extruder, a kneader, a Banbury mixer, or the like because a polymer composition in which the respective components are more uniformly dispersed and reacted can be obtained.

In a case where the melt-kneading is performed using an extruder, the polymer E' and the compound E may be mixed with each other in advance and then supplied from a hopper, or some components may be supplied from a hopper and then other components may be supplied through a supply port provided at any position between the vicinity of the hopper and a tip end of the extruder.

A temperature at which the components are melted and kneaded is equal to or higher than the highest melting point of the melting points of the components to be mixed. Specifically, the melting and kneading are performed in a range of preferably 150 to 300° C., more preferably 200 to 280° C., and still more preferably 230 to 270° C.

The polypropylene EM is excellent in fluidity at 190° C. or 230° C. A melt flow rate (MFR) of the polypropylene EM at 190° C. or 230° C. and a load of 2.16 Kg is preferably 0.01 to 400 g/10 min, more preferably 0.1 to 300 g/10 min, and still more preferably 1 to 200 g/10 min. When the MFR is within the above range, a reinforcing property and dispersibility of reinforcing fiber are excellent, which is preferable.

In order to produce the polypropylene EM, it is possible to use various methods such as "Practical Polymer Alloy Design" (written by Fumio Ide, published by Kogyo Chosakai Publishing Co., Ltd. (1996)), Prog. Polym. Sci., 24, 81-142 (1999). That is, any of a solution method, a bulk method, and a melt-kneading method may be used. In addition, these methods may be used in combination.

In the production of the polypropylene EM, when a mixing ratio is set so that a ratio of the number of moles of the group reacting with the epoxy group in the polymer E' to the number of moles of the compound E is satisfied to 1:0.2 to 10.0, preferably 1:0.4 to 8.0, and more preferably 1:2.0 to 8.0, polypropylene EM having high reaction efficiency between the polymer E' and the compound E and excellent fluidity can be obtained, which is preferable.

In addition, a content of the epoxy group in the polypropylene EM with respect to 100 g of the polypropylene EM is not particularly limited, and preferably 1 mmol or more, more preferably 5 mmol or more, and still more preferably 10 mmol or more, to enhance the reinforcement effect of reinforcing fiber and the effect of improving water deterioration resistance. In addition, the content is preferably 200 mmol or less, more preferably 150 mmol or less, and still more preferably 100 mmol or less, to enhance moldability, the reinforcement effect of the reinforcing fiber, the effect of improving dispersibility, and cost-effectiveness. In this light, when producing the polypropylene EM, it is preferable that a mixing amount of the compound E is adjusted so that the content of the epoxy group in the polypropylene EM is in the above range.

Furthermore, in the production of the polypropylene EM, it is also important to control the reaction between the group reacting with the epoxy group in the polymer E' and the epoxy group in the compound E. A degree of progression of the reaction between the group reacting with the epoxy group in the polymer E' and the epoxy group in the compound E can be examined by, for example, the following method.

A heat press sheet of each of the polymer E' and the polypropylene EM obtained by the reaction is prepared, and then infrared absorption is measured using an infrared absorption analyzer. From the obtained sheets, an absorbance in an absorption band (1,790 cm$^{-1}$ when using maleic anhydride) resulting from a peak intensity of the compound having the group reacting with the epoxy group in each of the polymer E' and the polypropylene EM can be compared with an absorbance before and after the reaction to calculate a reaction rate$_E$ using the following equation.

$$\text{Reaction rate}_E \, (\%) = X_E / Y_E \times 100$$

$X_E$=absorbance of group reacting with epoxy group in polymer E' before reaction-absorbance of group reacting with epoxy group in polypropylene EM after reaction $Y_E$=absorbance of group reacting with epoxy group in polymer E' before reaction The reaction rate for the polypropylene EM calculated by the above method is preferably 20 to 100%, more preferably 25 to 100%, and still more preferably 40 to 100%.

In addition, the polypropylene EM is produced by reacting the epoxy group in the compound E with the group reacting with the epoxy group in the polymer E' as described, but an epoxy residue derived from the compound E bonded to polypropylene may be present in the polymer E', and the epoxy residue interacts with the reinforcing fiber to contribute to the reinforcing property and dispersibility. The amount of the epoxy residue can be considered as a size of a peak resulting from contraction vibration of the epoxy group in 899 to 910 cm$^{-1}$ in IR measurement.

The polypropylene EM may contain two or more polymers E' and two or more compounds E.

In addition, a known process stabilizer, heat resistance stabilizer, heat-aging-resistant agent, or the like can also be added to the polypropylene EM as long as the object of the present disclosure is not impaired.

Polypropylene Having Group Reacting with Epoxy Group (Polymer E')

The polypropylene having the group reacting with the epoxy group (polymer E') can be obtained by introducing a compound reacting with an epoxy group into polypropylene.

An example of the compound reacting with the epoxy group can include a compound having a group having active hydrogen having reactivity with an epoxy group, and a specific example thereof can include a compound having a group derived from a carboxylic acid, amine, phenol, thiol, or the like. Among them, a compound having a group derived from a carboxylic acid is preferably used, and particularly, an unsaturated carboxylic acid and/or a derivative thereof is preferred. In the present disclosure, the compounds reacting with the epoxy group may be used alone or in combination of two or more thereof.

In a case where an unsaturated carboxylic acid and/or a derivative thereof is used as the compound reacting with the epoxy group, examples thereof can include an unsaturated compound having one or more carboxylic acid groups and an unsaturated compound having one or more carboxylic acid anhydride groups and derivatives thereof. Examples of the unsaturated compound can include a vinyl group, a vinylene group, and an unsaturated cyclic hydrocarbon group. Specific examples thereof can include an unsaturated carboxylic acid such as acrylic acid, methacrylic acid, maleic acid, fumaric acid, tetrahydrophthalic acid, itaconic acid, citraconic acid, crotonic acid, isocrotonic acid, norbornenedicarboxylic acid, or bicyclo[2,2,1]hepto-2-ene-5,6-dicarboxylic acid, and acid anhydride thereof and a derivative thereof (for example, acid halide, amide, imide, ester, or the like). Specific examples of the compound can include malenyl chloride, malenyl imide, maleic anhydride, itaconic anhydride, citraconic anhydride, tetrahydrophthalic anhydride, bicyclo[2,2,1]hepto-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hepto-2-ene-5,6-dicarboxylate, hydroxyethyl (meth)acrylate, hydroxypropyl (meth)acrylate, aminoethyl methacrylate, and aminopropyl methacrylate.

Among them, maleic anhydride, (meth)acrylic acid, itaconic anhydride, citraconic anhydride, tetrahydrophthalic anhydride, bicyclo[2,2,1]hepto-2-ene-5,6-dicarboxylic anhydride, hydroxyethyl (meth)acrylate, or aminopropyl methacrylate is preferred. Further, dicarboxylic anhydride such as maleic anhydride, itaconic anhydride, citraconic anhydride, tetrahydrophthalic anhydride, or bicyclo[2,2,1] hepto-2-ene-5,6-dicarboxylic anhydride is particularly preferred. In particular, in the present disclosure, maleic anhydride is most preferred as the compound reacting with the epoxy group.

As a method of introducing a compound reacting with an epoxy group into polypropylene, various methods can be adopted. Examples thereof can include a method of graft-copolymerizing a compound reacting with an epoxy group to a polypropylene main chain and a method of radical-copolymerizing an olefin such as propylene and a compound reacting with an epoxy group. Hereinafter, the case of graft copolymerization and the case of radical copolymerization will be described, individually, in detail.

Graft Copolymerization

The polymer E' can be obtained by graft-copolymerizing a compound having a group reacting with an epoxy group to a polypropylene main chain.

Polypropylene used as the polypropylene main chain is a homopolymer or copolymer containing a propylene unit as a main component. In a case where a sub-component is present, as an olefin unit of the sub-component, an aliphatic α-olefin, cyclic olefin, non-conjugated diene, or aromatic olefin having 2 to 20 carbon atoms ($C_{2-20}$), preferably 2 to 10 carbon atoms ($C_{2-10}$), and more preferably 2 to 8 carbon atoms ($C_{2-8}$) other than propylene may be used. Here, a content of the propylene unit as the "main component" in the polypropylene is generally 50 mol % or more, preferably 60 mol % or more, and still more preferably 70 mol % or more. Preferred examples of the olefin that can be the sub-component can include ethylene, 1-butene, 4-methyl-1-pentene, 3-methyl-1-butene, 1-hexene, 1-octene, tetracyclododecene, norbornene, and styrene. In addition, both an isotactic structure and a syndiotactic structure can be used for the polypropylene, and there is no particular limitation on stereoregularity.

A density of the polypropylene used for graft modification is preferably 0.8 to 1.1 g/cm³, more preferably 0.8 to 1.05 g/cm³, and still more preferably 0.8 to 1 g/cm³. A melt flow rate (MFR) of the polypropylene at 190° C. or 230° C. and a load of 2.16 kg according to ASTM D1238 is generally 0.01 to 500 g/10 min, preferably 0.05 to 300 g/10 min, and more preferably 0.1 to 100 g/10 min. When the density and the MFR of the polypropylene are within the above ranges, a density and an MFR of a graft copolymer after modification are also similar to those of the polypropylene, resulting in easy handling.

In addition, a crystallinity degree of the polypropylene used for the graft modification is generally 2% or more, preferably 5% or more, and more preferably 10% or more. When the crystallinity degree is within the above range, handling of the graft copolymer after modification is excellent.

A number average molecular weight (Mn) of the polypropylene used for the graft modification measured by gel permeation chromatography (GPC) is preferably 5,000 to 500,000 and more preferably 10,000 to 100,000. When the Mn is within the above range, handling is excellent. In a case of a propylene-ethylene-based polyolefin, the number average molecular weight can be determined in terms of polypropylene when the amount of comonomer (the amount of ethylene) is less than 10 mol % and in terms of propylene-ethylene (based on a propylene content of 70 mol %) when the amount of comonomer is 10 mol % or more.

The polypropylene as described above can be produced by any of methods known in the related art. For example, polymerization can be performed using a titanium catalyst, a vanadium catalyst, a metallocene catalyst, or the like. In addition, the polypropylene may be in a form of any of a resin and an elastomer, both an isotactic structure and a syndiotactic structure can be used for the polypropylene, and there is no particular limitation on stereoregularity. A commercially available resin can be used as it is.

In a case where the polymer E' is obtained by graft copolymerization, a compound reacting with an epoxy group, and if necessary, other ethylenically unsaturated monomers are graft-copolymerized to the polypropylene as a graft main chain in the presence of a radical initiator.

A method of grafting the compound reacting with the epoxy group to the polypropylene main chain is not particularly limited, and a known graft polymerization method such as a solution method or a melting and kneading method can be adopted.

Radical Copolymerization

The polymer E' can be obtained by radical-copolymerizing a compound reacting with an epoxy group and an olefin such as propylene. The same olefin as the olefin for forming the polyolefin as a graft main chain described above can be adopted as the olefin. In addition, the compound reacting with the epoxy group is also the same as described above.

A method of radical-copolymerizing the compound reacting with the epoxy group and the olefin is not particularly limited, and a known radical copolymerization method can be adopted.

Regardless of which copolymerization method such as graft copolymerization or radical copolymerization is adopted, it is preferable that the polymer E' satisfies the following conditions.

A content of the group reacting with the epoxy group in the polymer E' is not particularly limited, and is preferably 0.01 wt % or more to increase the number of bonding sites between the compound E as a skeleton of the polypropylene EM and the polymer E' so as to enhance a reinforcing property and dispersibility of reinforcing fiber in the fiber-reinforced polypropylene composition. In addition, the content is preferably 10 wt % or less, more preferably 3 wt % or less, and still more preferably 2 wt % or less, to suppress crosslinking of the group reacting with the epoxy group by the compound E so as to facilitate the production of the polypropylene EM.

It is preferable that a number average molecular weight of the polymer E' is low and a molar ratio of (the number of moles of the group reacting with the epoxy group)/(the number of moles of a molecular chain of the polymer E') is small in order to prevent the crosslinking of the polymer E'. This means that in a case where the number of groups reacting with the epoxy group present on one molecular chain of the polymer E' is not plural but is as singular as possible, when the epoxy group in the compound E reacts with the group reacting with the epoxy group in the polymer E', the epoxy groups can be bonded without crosslinking and gelation.

In a case where the polymer E' is obtained by graft polymerization, when polypropylene as a graft main chain is a resin having a large amount of ethylene, crosslinking is likely to occur during production of the polypropylene EM as compared with a case when a resin having a large amount of an α-olefin copolymer such as an ethylene-butene copolymer is used. Therefore, it is preferable that the group reacting with the epoxy group is adjusted so that the number of groups reacting with the epoxy group present on one molecular chain of the polymer E' is as singular as possible in order to use a resin having a large amount of ethylene as a graft main chain and suppress crosslinking for production of the polypropylene EM.

In addition, in a case where polypropylene as a graft main chain is a resin whose molecular weight tends to be reduced by thermal decomposition, a high viscosity phenomenon due to crosslinking is unlikely to occur. Therefore, in a case where a resin that is likely to be thermally decomposed is used as a graft main chain, even when a plurality of groups reacting with the epoxy group are present on one molecular chain of the polymer E', the polypropylene EM can be produced without increasing the viscosity in some cases.

A melt flow rate (MFR) of the polymer E' having the group reacting with the epoxy group at a load of 2.16 kg and 190° C. or 230° C. according to ASTM D1238 is preferably 0.01 to 500 g/10 min and more preferably 0.05 to 300 g/10 min. When the MFR is in the above range, polypropylene EM having an excellent effect of improving a reinforcing property and dispersibility of reinforcing fiber can be obtained.

In addition, a density of the polymer E' is preferably 0.8 to 1.1 g/cm³, more preferably 0.8 to 1.05 g/cm³, and still more preferably 0.8 to 1 g/cm³.

Epoxy Group-Containing Compound (Compound E)

The epoxy group-containing compound (compound E) is preferably polyepoxide having a repeating unit represented by the following General Formula (8).

[Chem. 1]

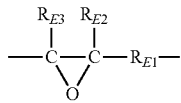

(wherein $R_{E1}$ represents a divalent organic group, $R_{E2}$ and $R_{E3}$ each independently represent a monovalent organic group, and an asymmetric carbon represents an arbitrary stereoconfiguration on condition that it is not contrary to an epoxide structure.)

A method of synthesizing polyepoxide is not particularly limited, and for example, polyepoxide can be synthesized by reacting an organic polyolefin in the presence of a catalyst for accelerating an epoxide reaction of a double bond.

A number average molecular weight ($Mn_E$) in terms of polystyrene of the compound E determined by gel permeation chromatography (GPC) is preferably 400 to 500,000, more preferably 1,000 to 10,000, and still more preferably 2,000 to 4,000. When the number average molecular weight ($Mn_E$) is in the above range, polypropylene EM having an excellent effect of improving a reinforcing property and dispersibility of reinforcing fiber can be obtained, which is preferable.

Monoepoxide may be added to the compound E, or a single epoxy group-containing compound or a mixture of a plurality of epoxy group-containing compounds may also be used.

It is possible to use a commercially available epoxy group-containing compound as it is. Examples of the commercially available epoxy group-containing compound can include TEPIC-S, TEPIC-L, and TEPIC-HP (manufactured by Nissan Chemical Industries, Ltd.).

A content of the epoxy groups in the compound E and the obtained polypropylene EM can be measured by $^{13}$C-NMR, IR, a titration method, or the like to grasp an epoxide equivalent. A peak at 52 ppm is observed by $^{13}$C-NMR and a peak at 899 to 910 cm$^{-1}$ is observed by IR.

For example, $^{13}$C-NMR measurement is performed as follows. That is, 0.35 g of a sample is heated and dissolved in 2.0 ml of hexachlorobutadiene. The solution is filtered with a glass filter (G2), 0.5 ml of deuterated benzene is added to the solution, and the solution is charged into an NMR tube having an inner diameter of 10 mm. Then, $^{13}$C-NMR measurement is performed at 120° C. using a GX-500 type NMR measuring apparatus (manufactured by JEOL Ltd.). An integration number is 10,000 times or more.

For example, IR measurement is performed as follows. That is, a sample is heat-pressed at 250° C. for 3 minutes to prepare a sheet, and then an infrared absorption spectrum of the sheet is measured by a transmission method using an infrared spectrophotometer (FT-IR 410 type, manufactured by JASCO Corporation). As the measurement conditions, a resolution is set to 2 cm$^{-1}$ and an integration number is set to 32 times.

The infrared absorption spectrum measured by the transmission method is inversely proportional to a thickness of the sample as shown by Lambert-Beer's law, and an absorbance itself does not indicate a concentration of the epoxy group in the sample. Therefore, for measuring the content of the epoxy group, the thickness of the sample to be measured is required to be equalized, or a peak intensity of the epoxy group is required to be normalized using an internal standard peak.

In a case where the content of the epoxy group in the polypropylene EM is measured by IR measurement, the IR measurement is performed using a sample whose concentration of the epoxy group is known in advance, a calibration curve is prepared using a ratio of an absorbance at a peak appearing at 899 to 910 cm$^{-1}$ to an absorbance at an internal standard peak, and the measured value of the sample is substituted in the calibration curve to determine a concentration.

As the internal standard peak, a peak derived from the polypropylene skeleton may be used, or an internal standard substance may be mixed in advance so that a concentration thereof in the sample is constant and then used for measurement.

Content

Regarding a content of each of the polypropylene (component 1), the carbon fiber (component 2), and the modified polypropylene (component 3) contained in the carbon fiber-containing polypropylene composition of the present disclosure, a content of the component 1 is 30 to 98 wt %, preferably 50 to 90 wt %, and more preferably 60 to 80 wt %, with respect to 100 wt % of a total weight of the component 1, the component 2, and the component 3. The content of the component 2 is 1 to 50 wt %, preferably 3 to 40 wt %, and more preferably 10 to 30 wt %. The content of the component 3 is 1 to 20 wt %, preferably 3 to 30 wt %, and more preferably 5 to 20 wt %.

Surface of Carbon Fiber

The carbon fiber (component 2) contained in the carbon fiber-containing polypropylene composition of the present disclosure has a surface containing a predetermined amount of each of a C—O bond, a C=O bond, an O—C=O bond, a C—C bond, and a C—N bond so as to increase mechanical strength of the polypropylene composition. In all of the above and following aspects, the "C—O bond" does not include a C—O bond in the "O—C=O bond", and the "C=O bond" does not include a C=O bond in the "O—C=O bond".

In an aspect, the component 2 contains a C—O bond, a C=O bond, an O—C=O bond, a C—C bond, and a C—N bond. A content of the C—O bond is 1 to 24%, preferably 3 to 20%, and more preferably 5 to 15%, with respect to 100% of a total spectrum area of the C—O bond, the C=O bond, the 0-C=O bond, the C—C bond, and the C—N bond.

In an aspect, the component 2 contains a C—O bond, a C=O bond, an O—C=O bond, a C—C bond, and a C—N bond. A total content of the C=O bond and the O—C=O bond is 4 to 15%, preferably 5 to 12%, and more preferably 5 to 8%, with respect to 100% of a total spectrum area of the C—O bond, the C=O bond, the O—C=O bond, the C—C bond, and the C—N bond.

In an aspect, the component 2 contains a C—O bond, a C=O bond, an O—C=O bond, a C—C bond, and a C—N bond. A content of the C—O bond is 5 to 24%, preferably 3 to 20%, and more preferably 5 to 15%, with respect to 100% of a total spectrum area of the C—O bond, the C=O bond, the 0-C=O bond, the C—C bond, and the C—N bond. A total content of the C=O bond and the 0-C=O bond is 4 to 15%, preferably 5 to 12%, and more preferably 5 to 8%, with respect to 100% of the total spectrum area of the C—O bond, the C=O bond, the O—C=O bond, the C—C bond, and the C—N bond.

Method of Calculating Bond Component in Surface of Carbon Fiber

The bond amount of each component in the surface of the carbon fiber can be measured by an X-ray photoelectron spectrometer. Before the measurement, a pre-treatment such as removing of an unreacted sizing agent may be performed, if necessary.

A characteristic X-ray such as a monochromatic Al Kα ray (1,486.6 eV) or Mg Kα ray (1,253.6 eV) can be used as an excitation source.

The obtained spectrum can be waveform-separated for each bond by a known method.

For example, the amount of each bond component in the surface of the carbon fiber can be calculated by a method described in Examples.

Molded Article

The carbon fiber-containing polypropylene composition of the present disclosure is used, for example, to produce a molded article by the following method.

An example of a method of producing a molded article can include a method including a step of melting and molding the polypropylene composition to obtain a molded article.

Examples of a molding method can include an extrusion molding method and an injection molding method. For example, a sheet-like molded article can be obtained by extrusion molding. An injection molded article can be obtained by injection molding.

Examples of the injection molding method can include a general injection molding method, an injection foam molding method, a supercritical injection foam molding method, an ultrahigh speed injection molding method, an injection compression molding method, a gas-assist injection molding method, a sandwich molding method, a sandwich foam molding method, and an insert•outsert molding method.

Use

The carbon fiber-containing polypropylene composition and the molded article of the present disclosure can be used, for example, as an automobile member such as an automobile interior or exterior part.

EXAMPLES

Hereinafter, the present disclosure will be described in more detail with reference to Examples and Comparative Examples, but the present disclosure is not limited thereto.

Method of Calculating Bond Component in Surface of Carbon Fiber

Removal of Sizing Agent

A temperature of an accelerated solvent extractor ASE-200 (manufactured by Nippon Dionex K.K.) was set to 80° C., and then 0.2 g of carbon fiber was placed in an extraction cell container having a volume of 11 ml and installed in the accelerated solvent extractor ASE-200. 11 ml of tetrahydrofuran (manufactured by Kanto Chemical Co., Inc., special grade, containing no stabilizer) was injected to the extraction cell container, and then the pressure in the extraction cell container was pressurized to 1,000 psi and held for 15 minutes. About half of the tetrahydrofuran was expelled through a discharge port of the extraction cell container using nitrogen, tetrahydrofuran was injected again until the amount of tetrahydrofuran in the extraction cell container reached 11 ml, and then the pressure in the extraction cell container was pressurized to 1,000 psi and held for 10 minutes. About half of the tetrahydrofuran was expelled once again through the discharge port of the extraction cell container using nitrogen, tetrahydrofuran was injected again until the amount of tetrahydrofuran in the extraction cell container reached 11 ml, and then the pressure in the extraction cell container was pressurized to 1,000 psi and held for 10 minutes. Thereafter, nitrogen was injected to the extraction cell container for 2 minutes, and the tetrahydrofuran was expelled through the discharge port of the extraction cell container. The carbon fiber was removed from the extraction cell container and vacuum drying was performed at 40° C. for at least 15 hours.

X-Ray Photoelectron Spectroscopy (XPS) Analysis

Next, the carbon fiber subjected to the above work was installed in an X-ray photoelectron spectrometer (manufactured by Shimadzu-Kratos Corp., AXIS ULTRA DLD). A monochromatic Al Kα (1,486.6 eV) was used as an X-ray source and used as excitation light. A tube current was set to 10 mA, a tube voltage was set to 15 kV, and a photoelectron take-off angle defined by an angle between a normal direction of the sample and a photoelectron take-off direction was set to 0', thereby measuring an output. A background of the obtained carbon is spectrum was removed by the Shirley method.

The carbon is spectrum from which the background was removed was waveform-separated for a peak derived from each of a C—C bond component, a C—N bond component, a C—O bond component, a C=O bond component, and an O—C=O bond component, by using a Gauss-Lorentz complex function in which a ratio of a Lorentz function was set to 30%, according to a method described in Composites: Part A 90 (2016) 653-661 (Bo Gao et al.).

A spectrum area of each of the C—C bond component, the C—N bond component, the C—O bond component, the C=O bond component, and the O—C=O bond component obtained by the waveform separation was determined, and a ratio of the spectrum area of the C—O bond component and a ratio of a total amount of the spectrum area of the C=O bond component and the spectrum area of the O—C=O bond component with respect to 100% of a total amount of the C—C bond component, the C—N bond component, the C—O bond component, the C=O bond component, and the O—C=O bond component were calculated.

Synthesis Example of Modified Polypropylene

Maleic Anhydride-Modified Polypropylene-1

Synthesis Example 2 described in WO 2020/009090 A was used.

Carbodiimide-Modified Polypropylene-1

100 wt % of the maleic anhydride-modified polypropylene-1 synthesized in the above, 1.7 wt % of a carbodiimide group-containing compound (manufactured by Nisshin Boseki Co., Ltd., trade name: Carbodilite (registered trademark) HMV-15CA (carbodiimide equivalent: 262 g/mol)), 0.2 wt % of an antioxidant 1 (manufactured by Sumitomo Chemical Co., Ltd., Sumilizer GA80), and 0.2 wt % of an antioxidant 2 (manufactured by Sumitomo Chemical Co., Ltd., Sumilizer GP) were mixed with each other, and the mixture was melted and kneaded with a twin-screw kneader (manufactured by TECHNOVEL Corporation, KZW-15, screw diameter: 15 mm, L/D=45, cylinder temperature: 250° C., rotation speed: 300 rpm, discharge: 2 kg/hr) while degassing from a vacuum vent, thereby obtaining carbodiimide-modified polypropylene-1. An MFR (230° C. and load of 2.16 kg) of the obtained carbodiimide-modified polypropylene-1 was 18 g/10 min.

Epoxy-Modified Polypropylene-1

100 wt % of the maleic anhydride-modified polypropylene-1 synthesized in the above, 0.67 wt % of an epoxy group-containing compound (manufactured by Nissan Chemical Industries, Ltd., trade name: TEPIC-S (epoxy equivalent: 105 g/eq), 0.2 wt % of an antioxidant 1, and 0.2 wt % of an antioxidant 2 were mixed with each other, and the mixture was melted and kneaded with a twin-screw kneader (manufactured by TECHNOVEL Corporation, KZW-15, screw diameter: 15 mm, L/D=45, cylinder temperature: 250° C., rotation speed: 300 rpm, discharge: 2 kg/hr) while degassing from a vacuum vent, thereby obtaining epoxy-modified polypropylene-1. An MFR (230° C. and load of 2.16 kg) of the obtained epoxy-modified polypropylene-1 was 69 g/10 min.

Carbon Fiber 2

About 10 g of CFRI T8S103C (manufactured by Carbon Fiber Recycle Industry Co., Ltd.) was weighed and put into a 100 mL magnetic crucible, and the magnetic crucible was charged into an electric furnace (manufactured by TT-Labo Co., LTD., TFD-20C-Z). The electric furnace was heated from room temperature to 500° C. at about 65° C./min and was allowed at 500° C. for 1 hour, thereby obtaining carbon fiber 2.

The obtained carbon fiber 2 was subjected to removal of a sizing agent by the method described above. As a result of measuring a content of the C—O bond and a total content of the C=O bond and the O—C=O bond by the method described above, the content of the C—O bond was 19.3%, and the total content of the C=O bond and the O—C=O bond was 11.3%.

Used Materials

The following materials were used in Examples and Comparative Examples.

1. Polypropylene (Component 1)

Polypropylene homopolymer 1 (manufactured by Sumitomo Chemical Co., Ltd., NOBLEN HR100EG)

MFR (230° C., load of 21.2 N): 23 g/10 min

Melting point: 164° C.

Polypropylene homopolymer 2 (manufactured by Sumitomo Chemical Co., Ltd., NOBLEN HU100EG)

MFR (230° C., load of 21.2 N): 100 g/10 min

Melting point: 164° C.

2. Carbon Fiber (Component 2)

Carbon fiber 1 (manufactured by Carbon Fiber Recycle Industry Co., Ltd., CFRI T8S103C)

C—O bond: 5.2%, total of C=O bond and O—C=O bond: 5.8%

Carbon fiber 2 (obtained by performing heat treatment on carbon fiber-1 at 500° C. for 1 hour)

C—O bond: 19.3%, total of C=O bond and O—C=O bond: 11.3%

Carbon fiber 3 (manufactured by Teijin Limited, Tenax-A PCS171200)

C—O bond: 14.2%, total of C=O bond and O—C=O bond: 7.3%

Carbon fiber 4 (manufactured by Teijin Limited, Tenax-J IM C443)

C—O bond: 24.7%, total of C=O bond and O—C=O bond: 2.7%

Carbon fiber 5 (manufactured by SGL CARBON JAPAN Co., Ltd., SIGRAFIL C C6-4.0/240-T130)

C—O bond: 27.4%, total of C=O bond and O—C=O bond: 3.1%

3. Modified Polypropylene (Component 3)

Modified Polypropylene 1

The maleic anhydride-modified polypropylene of Synthesis Example

Modified Polypropylene 2

The carbodiimide-modified polypropylene of Synthesis Example

Modified Polypropylene 3 The epoxy-modified polypropylene of Synthesis Example

4. Other Materials

Antioxidant 3: manufactured by BASF Japan Ltd., Irganox 1010

Antioxidant 4: manufactured by BASF Japan Ltd., Irgafos 168

Melting and Kneading and Production of Injection Molded Article

Example 1

70 wt % of the polypropylene homopolymer 1, 10 wt % of the modified polypropylene 1, 20 wt % of the carbon fiber 1, and 0.2 parts by weight of the antioxidant 3 and 0.2 parts by weight of the antioxidant 4 with respect to 100 parts by weight of a total of the polypropylene homopolymer 1, the modified polypropylene 1, and the carbon fiber 1 were mixed with each other to obtain a mixture. The mixture was melted and kneaded with a 40 mm single screw extruder (VS40-28 bent type extruder, manufactured by TANABE PLASTICS MACHINERY CO., LTD.) at a cylinder temperature of 220° C. and a screw rotation speed of 100 rpm, and the mixture was pelletized, thereby obtaining a carbon fiber-containing polypropylene composition. The obtained carbon fiber-containing polypropylene composition was subjected to injection molding using an injection molding machine (manufactured by Meiki Co., Ltd., M-70CSJ) under conditions of a cylinder temperature of 220° C., a mold temperature of 50° C., and an injection speed of 20 mm/sec, thereby obtaining an injection molded article of an ISO test piece.

Examples 2 to 8 and Comparative Examples 1 to 4

Carbon fiber-containing polypropylene compositions of Examples 2 to 8 and Comparative Examples 1 to 4 were produced in the same manner as that of Example 1 except that the materials shown in Table 1 were used.

Evaluation of Physical Properties

1. Melt Mass Flow Rate (Unit: g/10 min)

A melt mass flow rate was measured at a measurement temperature of 230° C. and a load of 2.16 kg according to a method specified in JIS K 7210.

2. Density (Unit: $g/cm^3$)

Using the molded article molded by the molding method described in "Melting and Kneading and Production of Injection Molded Article" and cut into a size of 80 mm×10 mm×4 mm as a test piece, a density was measured according to a water replacement method which is the A method specified in JIS K7112.

3. Ultimate tensile Break Strength (Unit: MPa)

Using the test piece having a thickness of 4 mm molded by the molding method described in "Melting and Kneading and Production of Injection Molded Article", a ultimate tensile break strength (US) was measured at a tensile speed of 50 mm/min according to a method specified in ISO 527-2.

4. Flexural Strength (Unit: MPa)

Using the test piece having a thickness of 4 mm molded by the molding method described in "Melting and Kneading and Production of Injection Molded Article", a flexural strength (FS) was measured at a loading speed of 2.0 mm/min according to a method specified in ISO 178.

TABLE 1

| | | Carbon fiber | | Example | | | | | |
|---|---|---|---|---|---|---|---|---|---|
| | | C—O (%) | Total (%) of C=O and O— C=O | 1 | 2 | 3 | 4 | 5 | 6 |
| Component 1 | Polypropylene homopolymer 1 | | | 70 | | 70 | 70 | 70 | 70 |
| | Polypropylene homopolymer 2 | | | | 70 | | | | |
| Component 2 | Carbon fiber 1 | 5.2 | 5.8 | 20 | 20 | | 20 | 20 | |
| | Carbon fiber 2 | 19.3 | 11.3 | | | 20 | | | |
| | Carbon fiber 3 | 14.2 | 7.3 | | | | | | 20 |
| | Carbon fiber 4 | 24.7 | 2.7 | | | | | | |
| | Carbon fiber 5 | 27.4 | 3.1 | | | | | | |
| Component 3 | Modified polypropylene 1 | | | 10 | 10 | 10 | | | 10 |
| | Modified polypropylene 2 | | | | | | 10 | | |
| | Modified polypropylene 3 | | | | | | | 10 | |
| | Ultimate tensile strength (MPa) | | | 121 | 130 | 131 | 131 | 130 | 129 |
| | Flexural strength (MPa) | | | 169 | 179 | 175 | 183 | 178 | 184 |
| | Density ($g/cm^3$) | | | 0.993 | 0.991 | 0.996 | 0.993 | 0.994 | 0.994 |
| | MFR (g/10 min) | | | 2.3 | 11 | 2.9 | 2.1 | 1.7 | 2.8 |

| | | Carbon fiber | | Example | | | | Comparative Example | |
|---|---|---|---|---|---|---|---|---|---|
| | | C—O (%) | Total (%) of C=O and O— C=O | 7 | 8 | 1 | 2 | 3 | 4 |
| Component 1 | Polypropylene homopolymer 1 | | | 90 | 90 | 80 | 70 | 70 | 90 |
| | Polypropylene homopolymer 2 | | | | | | | | |

TABLE 1-continued

| | | | | | | | | |
|---|---|---|---|---|---|---|---|---|
| Component 2 | Carbon fiber 1 | 5.2 | 5.8 | 5 | | 20 | | |
| | Carbon fiber 2 | 19.3 | 11.3 | | | | | |
| | Carbon fiber 3 | 14.2 | 7.3 | | 5 | | | |
| | Carbon fiber 4 | 24.7 | 2.7 | | | | 20 | |
| | Carbon fiber 5 | 27.4 | 3.1 | | | | 20 | 5 |
| Component 3 | Modified polypropylene 1 | | | 5 | 5 | | 10 | 10 | 5 |
| | Modified polypropylene 2 | | | | | | | | |
| | Modified polypropylene 3 | | | | | | | | |
| Ultimate tensile strength (MPa) | | | | 63 | 70 | 83 | 109 | 75 | 44 |
| Flexural strength (MPa) | | | | 87 | 95 | 119 | 147 | 94 | 64 |
| Density (g/cm³) | | | | 0.927 | 0.927 | 0.994 | 0.994 | 0.996 | 0.929 |
| MFR (g/10 min) | | | | 10 | 7.9 | 1.7 | 0.9 | 1.8 | 7.7 |

What is claimed is:

1. A carbon fiber-containing polypropylene composition comprising:
   polypropylene (component 1),
   carbon fiber (component 2), and
   maleic anhydride-modified polypropylene (component 3), and satisfying all of the following requirements:
   Requirement 1: the content of the component 1 is 30 to 98 wt %, the content of the component 2 is 1 to 50 wt %, and the content of the component 3 is 1 to 20 wt % with respect to 100 wt % of the total weight of the component 1, the component 2, and the component 3; and
   Requirement 2-1: the component 2 contains the C—O bond, the C=O bond, the O—C=O bond, the C—C bond, and the C—N bond, a wherein the content of the C—O bond is 1 to 24% with respect to 100% of the total spectrum area of the C—O bond, the C=O bond, the O—C=O bond, the C—C bond, and the C—N bond, wherein the total spectrum area is analyzed by X-ray Photoelectron Spectroscopy.

2. A molded article comprising the carbon fiber-containing polypropylene composition according to claim 1.

3. A carbon fiber-containing polypropylene composition comprising:
   polypropylene (component 1),
   carbon fiber (component 2), and
   maleic anhydride-modified polypropylene (component 3), and satisfying all of the following requirements:
   Requirement 1: the content of the component 1, is 30 to 98 wt %, the content of the component 2 is 1 to 50 wt %, and the content of the component 3 is 1 to 20 wt % with respect to 100 wt % of the total weight of the component 1, the component 2, and the component 3; and
   Requirement 2-2: the component 2 contains the C—O bond, the C=O bond, the O—C=O bond, the C—C bond, and the C—N bond, and the total content of the C=O bond and the O—C=O bond is 4 to 15% with respect to 100% of the total spectrum area of the C—O bond, the C=O bond, the O—C=O bond, the C—C bond, and the C—N bond wherein the total spectrum area is analyzed by X-ray Photoelectron Spectroscopy.

4. A molded article comprising the carbon fiber-containing polypropylene composition according to claim 3.

5. A carbon fiber-containing polypropylene composition comprising:
   polypropylene (component 1),
   carbon fiber (component 2), and
   maleic anhydride-modified polypropylene (component 3), and satisfying all of the following requirements:
   Requirement 1: the content of the component 1, is 30 to 98 wt %, the content of the component 2 is 1 to 50 wt %, and the content of the component 3 is 1 to 20 wt % with respect to 100 wt % of the total weight of the component 1, the component 2, and the component 3; and
   Requirement 2-3: the component 2 contains the C—O bond, the C=O bond, the O—C=O bond, the C—C bond, and the C—N bond, and the content of the C—O bond is 1 to 24% and the total content of the C=O bond and the O—C=O bond is 4 to 15% with respect to 100% of the total spectrum area of the C—O bond, the C=O bond, the O—C=O bond, the C—C bond, and the C—N bond, wherein the total spectrum area is analyzed by X-ray Photoelectron Spectroscopy.

6. A molded article comprising the carbon fiber-containing polypropylene composition according to claim 5.

* * * * *